US011384279B2

(12) United States Patent
Guan et al.

(10) Patent No.: US 11,384,279 B2
(45) Date of Patent: Jul. 12, 2022

(54) DELAYED GELATION OF POLYMERS

(71) Applicants: CONOCOPHILLIPS COMPANY, Houston, TX (US); University of Kansas, Lawrence, KS (US)

(72) Inventors: Huili Guan, Lawrence, KS (US); Cory Berkland, Lawrence, KS (US); Ahmad Moradi-Araghi, Bixby, OK (US); Jenn-Tai Liang, College Station, TX (US); Terry M. Christian, Bartlesville, OK (US); Riley B. Needham, Bartlesville, OK (US); Min Cheng, Bartlesville, OK (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 17/079,877

(22) Filed: Oct. 26, 2020

(65) Prior Publication Data

US 2021/0054260 A1    Feb. 25, 2021

Related U.S. Application Data

(62) Division of application No. 14/847,734, filed on Sep. 8, 2015, now Pat. No. 10,851,286.

(60) Provisional application No. 62/081,950, filed on Nov. 19, 2014.

(51) Int. Cl.
*C09K 8/588* (2006.01)
*C09K 8/50* (2006.01)
*C09K 8/512* (2006.01)

(52) U.S. Cl.
CPC ............... *C09K 8/588* (2013.01); *C09K 8/50* (2013.01); *C09K 8/512* (2013.01)

(58) Field of Classification Search
CPC .................................. C09K 8/588; C09K 8/50
USPC ........................................................ 166/300
See application file for complete search history.

(56) References Cited

U.S. PATENT DOCUMENTS

| | | | |
|---|---|---|---|
| 3,749,172 A * | 7/1973 | Hessert | C09K 8/887 166/400 |
| 3,949,811 A | 4/1976 | Threlkeld et al. | |
| 4,683,949 A | 8/1987 | Sydansk et al. | |
| 4,706,754 A | 11/1987 | Smith et al. | |
| 5,069,281 A | 12/1991 | Tackett, Jr. | |
| 5,256,315 A | 10/1993 | Lockhart | |
| 5,415,229 A | 5/1995 | Sydansk | |
| 5,421,411 A | 6/1995 | Sydansk | |
| 2003/0109385 A1 | 6/2003 | Gunn et al. | |
| 2008/0035344 A1 | 2/2008 | Odeh et al. | |

(Continued)

OTHER PUBLICATIONS

Needham, R.B., et al., "Control of Water Mobility Using Polymers and Multivalent Cations," Paper SPE 4747 Presented at Improved Oil Recovery of SPE, Tulsa, OK, Apr. 22-24, 1974.

(Continued)

*Primary Examiner* — Zakiya W Bates
*Assistant Examiner* — Ashish K Varma
(74) *Attorney, Agent, or Firm* — Boulware & Valoir; Tamsen Valoir

(57) ABSTRACT

The disclosure is directed to methods and compositions delaying the gelation of polymers in water flooding by sequentially or co-injecting a carboxylate-containing polymer solution, a gel-delaying polymer, and gelation agent into a hydrocarbon reservoir. Delays of weeks are observed.

19 Claims, 7 Drawing Sheets

(56) References Cited

U.S. PATENT DOCUMENTS

| | | | |
|---|---|---|---|
| 2008/0223578 A1* | 9/2008 | Berkland | C09K 8/512 166/300 |
| 2012/0037364 A1 | 2/2012 | Guan | |
| 2014/0196894 A1 | 7/2014 | Berkland | |
| 2014/0202693 A1* | 7/2014 | Guan | C08L 1/286 166/270 |
| 2014/0209305 A1* | 7/2014 | Lin | C09K 8/604 166/270.1 |

OTHER PUBLICATIONS

Mumallah, N., "Chromium (III) Propionate: A Crosslinking Agent for Water-Soluble Polymers in Hard Oilfield brines," SPE reservoir Engineering, Feb. 1988, pp. 243-250.

Sydansk, R.D., "A New Conformance-Improvement-Treatment Chromium (III) Gel Technology," Paper SPE/DOE 17329, Presented at the SPE/DOE Enhanced Oil Recovery Symposium, Tulsa, OK Apr. 17-20, 1988.

Sydansk, R.D., "Field Testing of a New Conformance-Improvement-Treatment Chromium (III) Gel Technology," Paper SPE/DOE 17383, Presented at the SPE/DOE Enhanced Oil Recovery Symposium, Tulsa, OK Apr. 17-20, 1988.

Sydansk, R.D., "A Newly Developed Chromium (III) Gel Technology," SPE Reservoir Engineering, Aug. 1990, pp. 346-352.

Sydansk, R.D., "More Than 12 Years' Experience With a Successful Conformance-Control Polymer-Gel Technology," Paper SPE 49315, Presented at 1998 SPE Annual Technical. Conference & Exhibition, New Orleans, LA, Sep. 27-30, 1998.

Sydansk, R.D., "More Than 12 Years' Experience With a Successful Conformance-Control Polymer-Gel Technology," Paper SPE 62561, Presented at 2000 SPE/AAPG Western Regional Meeting, Long Beach, CA Jun. 19-23, 2000.

Sydansk, R.D., "Acrylamide-Polymer/Chromium (III)-Carboxylate Gels for Near Wellbore Matrix Treatments," SPE Advanced Technology Series, vol. I. No. 1, pp. 146-152.

Moffitt, P., et al., "Development and Field Testing of a New Low Toxicity Polymer Crosslinking System," Paper, SPE 35173, Presented at the Permian Basin Oil and Gas Recovery Conference, Midland, TX, Mar. 27-29, 1998.

Albonico, P., et al., "Effective Gelation-Delaying Additives for Cr+3/Polymer Gels," Paper SPE 25221, Presented at the SPE International Symposium on Oilfield Chemistry, New Orleans, LA, Mar. 2-5, 1993.

Albonico, P., et al., "New Polymer Gels for Reducing water Production in High-Temperature Reservoirs," Paper SPE 27609, Presented at European Production Operations Conference and Exhibition, Aberdeen, U.K. Mar. 15-17, 1994.

Bartosek, M., et al., "Polymer Gels for Conformance Treatments: Propagation of Cr(III) Crosslinking Complexes in Porous Media," Paper SPE/DOE 27828, Presented at the SPE/DOE Ninth Symposium on Improved Oil Recovery, Tulsa, OK Apr. 17-20, 1994.

Broseta, D., et al., Rheological Screening of Low Molecular Weight Polyacrylamide/Chromium(III) Acetate Water Shutoff Gels, Paper SPE 59319, Presented at the 2000 SPE/DOE Improved Oil Recovery Symposium, Tulsa, OK Apr. 3-5, 2000.

Albonico, P. & Lockhart, T.P., "Divalent Ion-Resistant Polymer gels for High-Temperature Applications Syneresis Inhibiting additives," Paper SPE 25220, Presented at SPE International Symposium on Oilfield Chemistry, New Orleans, LA, Mar. 2-5, 1993.

Lockhart, T.P., "Chemical properties of Chromium/Polyacrylamide gels," SPE Advanced Technology Series, vol. 2, No. 2. pp. 199-205.

Sanchez-Chaves, M., et al., "Poly (vinyl alcohol) functionalized by monosuccinate groups. Coupling of bioactive amino compounds" Polymer, vol. 39, No. 13, 2751-2757, 1998.

International Search Report for counterpart application, PCT/US2015/048893; dated Dec. 8, 2015.

European Search report for related application, App. No. 15861132.7, dated May 3, 2018.

Australian Application No. 2019257441 Office Action dated Jul. 14, 2020.

Australian Application No. 2015350513 Office Action dated Mar. 8, 2019.

Australian Patent No. 2015350513, granted Nov. 28, 2019.

Chinese Application No. 201580069437.3 1st Office Action dated Jul. 25, 2019.

Chinese Application No. 201580069437.3 2nd Office Action dated Jun. 30, 2020.

Canadian Application No. 2958354, 1st Office Action dated Oct. 27, 2020.

* cited by examiner

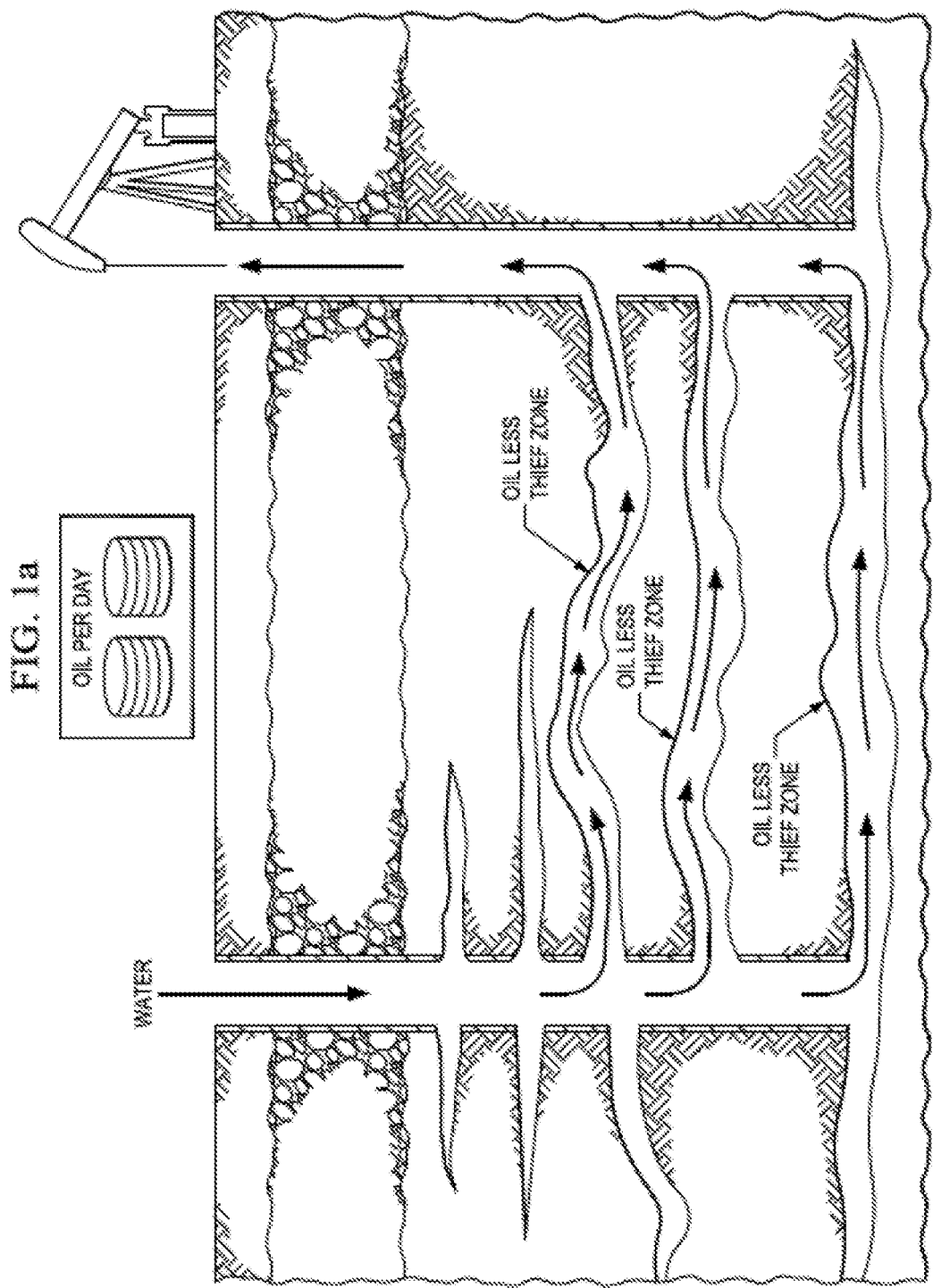

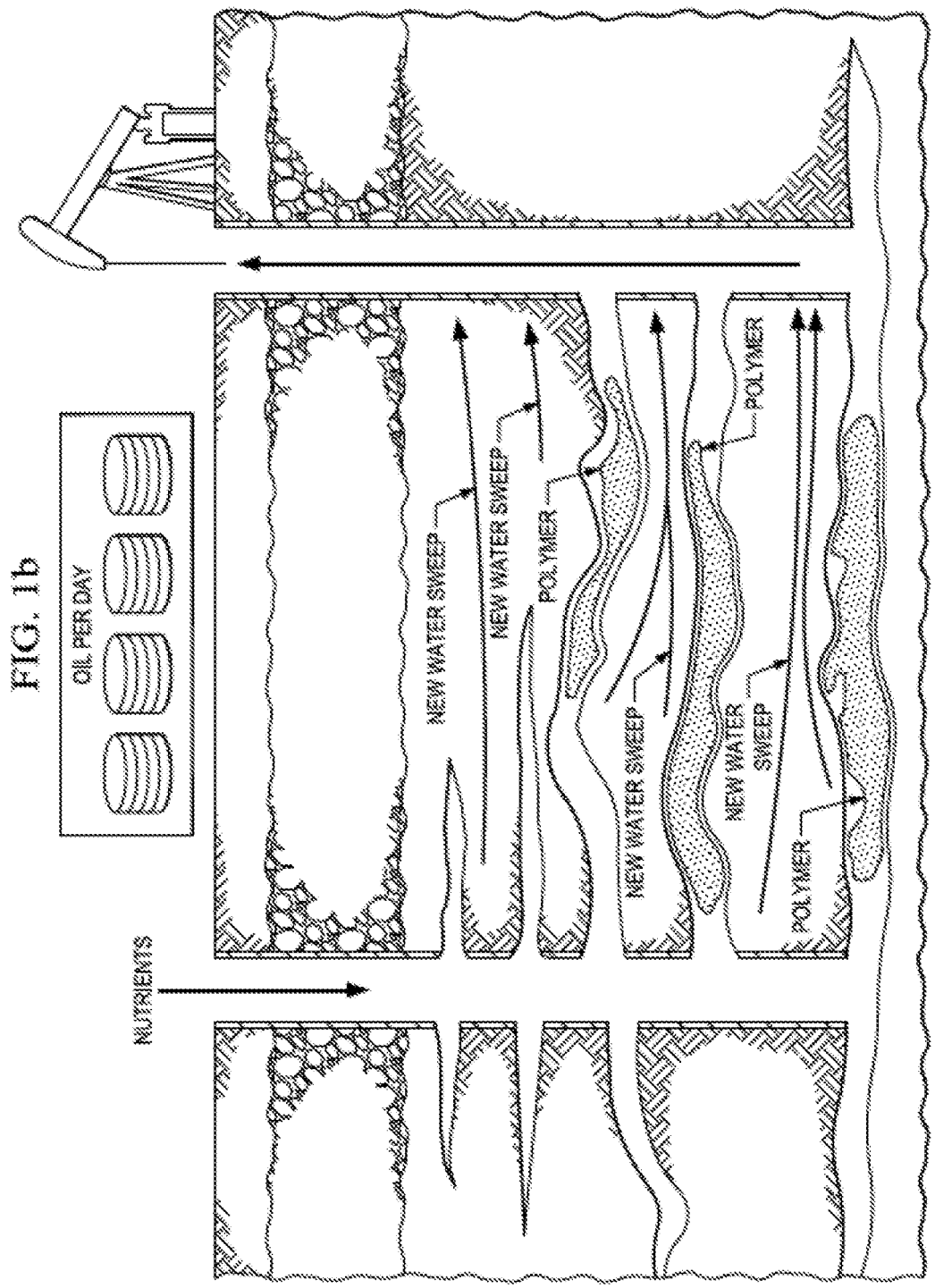

DELAYED GELATION OF POLYMERS

CROSS-REFERENCE TO RELATED APPLICATIONS

This invention is a divisional application of, and claims priority to, U.S. Ser. No. 14/847,734, filed on Sep. 8, 2015, which claims priority to U.S. Provisional Application No. 62/081,950, filed on Nov. 19, 2014. Each are incorporated by reference in its entirety herein for all purposes.

FEDERALLY SPONSORED RESEARCH STATEMENT

Not applicable.

REFERENCE TO MICROFICHE APPENDIX

Not applicable.

FIELD OF THE DISCLOSURE

This disclosure relates to compositions and processes for oil field applications. More specifically, the disclosure relates to delaying gelation of carboxylate-containing polymer solutions commonly used in enhanced oil recovery under reservoir conditions.

BACKGROUND OF THE DISCLOSURE

The challenge for all oil and gas companies is to produce as much oil as commercially feasible, leaving as little oil as possible trapped and wasted inside the reservoir. During the primary recovery stage, reservoir drive comes from a number of natural mechanisms. These include natural water pushing oil towards the production well, expansion of the natural gas at the top of the reservoir, expansion of gas initially dissolved in the crude oil, and gravity drainage resulting from the movement of oil within the reservoir from the upper regions to lower regions where the wells are located. Recovery factor during the primary recovery stage is typically about 5-15% under such natural drive mechanisms.

Over the lifetime of the well, however, the pressure will eventually fall, and at some point there will be insufficient underground pressure to force the oil to the surface. Once natural reservoir drive diminishes, enhanced recovery techniques are applied to further increase recovery.

Most enhanced recovery methods rely on the supply of external energy into the reservoir in the form of injecting fluids to increase reservoir pressure, hence replacing or increasing the natural reservoir drive with an artificial drive, and to sweep or displace the oil from the reservoir and push it towards the oil production wells. In addition, pumps, such as beam pumps, gas lift assisted pumping and electrical submersible pumps (ESPs), can be used to bring the oil to the surface.

Enhanced recovery techniques include increasing reservoir pressure by water injection, $CO_2$ injection, natural gas reinjection, and miscible injection (MI), the most common of which is probably water injection. Typical recovery factor from water-flood operations is about 30%, depending on the properties of oil and the characteristics of the reservoir rock. On average, the recovery factor after primary and secondary oil recovery operations is between 35 and 45%.

While enhanced recovery techniques are quite effective, the existence of fractures and highly porous or permeable regions reduces their effectiveness. Any gas or liquid that is injected into a well will naturally travel the least restrictive route, thus bypassing most of the oil in the less porous or less permeable regions. Thus, the overall effectiveness of the sweep is reduced by these so-called "thief zones," which channel injection fluid directly to production wells.

In such cases, polymers, foams, gelants, emulsions and the like are injected into the thief zones in order to block these zones, thus diverting the subsequent injection fluids to push previously unswept oil towards the production wells. Se e.g., FIG. 1A-B.

Among the polymers used for such purposes, partially hydrolyzed polyacrylamide (HPAM) crosslinked with Cr (III) gels have been widely used for water shutoff and sweep improvement in field applications. Polymer gels have been applied in enhanced oil recovery to improve the sweep efficiency, prolong the life of an oil well and maximize the recoverable oil amount by placing the gelants deep into the reservoir and blocking the high-permeability channels.

One of the difficulties with the use of polymers to block thief zones is the issue of viscosity. Viscous polymers are difficult to pump and, in presence of common crosslinking agents such as chromic acetate, gel too quickly to place deep in target zones. For this reason, there is considerable effort directed to delaying the crosslinking of polymers until they have already penetrated deep into the oil bearing reservoirs.

Many efforts have been directed to delaying the gelation of such polymers by adding a gelation delaying agent to the compositions. The use of ligands complexed with multivalent cations such as Al(III), Cr(III), Ti(IV) and Zr(IV) to crosslink partially hydrolyzed polyacrylamides has been a common practice to slow the rate of reactions of these cations with HPAM. The presence of ligands such as acetate, citrate, propionate, malonate, etc., which bind to multivalent cations, inhibit rapid interaction of the multivalent cations with the negative sites of HPAM to produce gels, thus delaying the rate of gelation. Fracture treatments in injection wells have been quite successful, especially when large treatment volumes are used. That is because less time is required for placement of gels in the fractures.

An extensive study (Albonico 1993) performed on evaluating various retarding ligands, ranked the effectiveness of hydroxycarboxylates, dicarboxylates and aminocarboxylates on retarding the gelation rate of Cr(II) with HPAM solutions. This study showed that malonate ions are 33 times slower than acetate to gel 0.5% HE-100, a copolymer of acrylamide and sodium AMPS, at 120° C. This study ranked ascorbate to be 51 times slower than acetate under the same conditions. The authors further tested the effectiveness of various ligands in propagation of Cr(III) ions in both sandstone and carbonate formations. They concluded that malonate ions are most effective in promoting propagation of Cr(III) in porous media, preventing precipitation and thus retention of Cr(III).

While the rates of gelation of HPAM with complexes of multivalent cations are slower than for un-complexed multivalent cations, they are still not slow enough. Extensive gelation tests with complexes of multivalent cations with HPAM indicate formation of non-flowing gels within a few hours, not long enough for deep placement of the gelants in high permeability thief zones, before reaching the non-flowing stage. Additionally, the integrity of the stabilized package due to chromatographic separation might hinder their effectiveness of such systems in treating high permeability targets deep in porous media matrix.

Extending the gelation times from a few hours to days or weeks, is therefore, highly desirable for the placement of the gelants deep in matrix target zones. Further, a less toxic package that is very stable in various brines and at typical reservoir temperatures would also be desirable, since the increased stability will allow deeper deployment.

Thus, what is needed in the art is a method for slowing the delaying time of polymer systems commonly used in oil field applications. In the ideal case, the gelation will be delayed by a few weeks to allow for deep penetration of gelants in the reservoir matrix. Additionally, techniques using environmentally friendly components are highly desirable for placement of gels deep into the reservoir matrix.

SUMMARY OF THE DISCLOSURE

The disclosure teaches the delayed formation of gels comprising polymers and crosslinkers commonly used in oil field applications by changing the order of injection.

Typically, carboxylated polymers and the gelling agent or crosslinker are injected into the reservoir together or in alternating slugs. The addition of e.g. Cr(III) chloride to carboxylated polymers such as HPAM or B29 (a microparticle form of HPAM) under similar conditions result in instant gelation or precipitation. The current state of art gelling system in which Cr(III) acetate or propionate are used to crosslink with HPAM solutions occur within a few hours at 40° C. This gelation time is too short to inject such gelant compositions deep into the matrix of oil-bearing formations, thus impeding deep reservoir deployment.

US20140202693 discloses a delayed gelling system which uses a di-carboxylated polymer such as polyaspartate ("PAsp") and polyvinyl alcohol succinate ("PVAS") to complex multivalent metal ions such as Cr(I) in a degradable nanogel. This nanogel is then co-injected with carboxylated polymer solutions into the reservoir. The labile bonds in PAsp and PVAS break over time, slowly releasing the multivalent metal ions, and allowing them to crosslink with the anionic sites of the co-injected carboxylated polymers to produce gels and block high permeability channels.

The present method improves upon US20140202693 by changing the order in which the components are added to achieve the same or better delayed gelling without forming a separate nanogel. In the presently disclosed method, a carboxylated polymer solution, at least one gel-delaying polymer, and a crosslinker are injected sequentially into an in-line mixer connected to an injection well. The resulting mixture is then pumped further into the reservoir. Thus, unlike US20140202693, time is saved by not forming a separate composition before injection.

The gelation time for the present method is generally longer than about 3 days, 5 days, 7 days, 10 days, 30 days or more, depending on temperature, crosslinkable polymer composition and concentration. Typical gelation times are 7-45 days, depending on temperature. Gelation time has been extended to at least 35 days at 85° C. before a non-flowing gel is set.

We have exemplified the gel-delaying polymer herein using PVAS and PAsp, but it is likely that many other molecules with similar chemistry could be used. Thus, any di- or tri-carboxylate that can be dehydrated to form an anhydride can be conjugated to polyvinyl alcohol (PVA) using similar chemical reactions. Thus, maleic anhydride (cis-butenedioic anhydride), is expected to be substitutable in the invention, as are glutaric anhydride, phthalic anhydride, oxalic anhydride, etc. Further, any di- or tri-carboxylate can be polymerized and used, based on our success with polyaspartate.

Though we used PVA as a base polymer to add the succinate to any polymer containing double bonds (such as vinyl, allyl, styrene, acrylamide, etc.) can be conjugated to e.g., succinate anhydride.

Carboxylate-containing polymers suitable for use in this invention are those capable of gelling in the presence of a crosslinking agent such as chromium or zirconium, and are preferably stable at reservoir conditions. Polymers suitable for use in this invention, include, but are not limited to, polysaccharides, such as carboxylated polysaccharides or carboxylated guar, cellulose ethers, such as carboxymethyl cellulose, and acrylamide-containing polymers.

HPAM was used herein as an exemplary polymer, but any acrylate-based polymer can also be used, provided there are sufficient, unhindered carboxylate groups available for the metal ion crosslinking reaction. Preferred polymers include those containing e.g., acrylamide, tert-butyl acrylate, acrylamido-2-methylpropane sulfonic acid, sodium 2-acrylamido-2-methylpropane sulfonate (NaAMPS), N,N, dimethyl acrylamide, and copolymers thereof. Other polymers include polysaccharide-based polymers, such as carboxylated guar or carboxymethyl cellulose. Furthermore, microparticles thereof that are capable of swelling or "popping" in situ can be used in the present methods. Preferred microparticles have 1-90% sodium acrylate, preferable 1-60% and most preferable 2-20%.

Other suitable acrylamide-containing polymers that also contain pendant carboxylate groups via which crosslinking can take place are disclosed in U.S. Pat. No. 3,749,172 (herein incorporated by reference in its entirety for all purposes).

Thermally stable carboxylate-containing polymers of acrylamide, such as terpolymers of N-vinyl-2-pyrrolidone and acrylamide and sodium acrylate; tetrapolymers of sodium-2-acrylamido-2-methylpropanesulfonate, acrylamide, N-vinyl-2-pyrrolidone and sodium acrylate; and terpolymers of sodium-2-acrylamido-2-methylpropanesulfonate and acrylamide and sodium acrylate; terpolymers of N,N dimethylacrylamide and acrylamide and sodium acrylate; and combinations of any two or more thereof, are particularly preferred for applications in high salinity environments at elevated temperatures for stability.

Selected carboxylate-containing terpolymers also are useful in the present process, such as tetrapolymers derived from acrylamide, sodium acrylate, and N-vinyl-2-pyrrolidone and N,N-dimethylacrylamide co-monomers with lesser amounts of monomers such as vinyl acetate, vinylpyridine, styrene, methyl methacrylate, and other polymers containing acrylate groups. While exemplified with a sodium counter ion, these polymers can be associated with any counter ion including, but not limited to, potassium cations, silver cations, quaternary ammonium cations and the like.

According to the present disclosure, the molecular weight of the carboxylate-containing polymers is generally at least about 1,000 Da and less than about 30,000,000 Da. However, polymers of any size are expected to be amenable with the present methods with slight modifications to the associated gel counterparts.

The mole percent % of the carboxylate group in carboxylate-containing polymers, such as partially hydrolyzed polyacrylamides (HPAM) is generally in the range of from about 0.01 to 100, preferably about 0.1 to less than about 55, more preferably about 1 to less than about 20 or about 40 to 50.

Suitable crosslinkers include multivalent metal ions include chromium, zirconium, titanium, aluminum and the like. The metal ions can also be complexed with a ligand, such as acetate, propionate, malonate, citrate and the like. Other cationic crosslinkers such as polyethylenimine (PEI) could be used.

The presently preferred multivalent metallic compound is selected from the group consisting of zirconium compounds, titanium compounds, aluminum compounds, iron compounds, chromium compounds, such as Cr(III) chloride, Cr(III) acetate, Cr(III) propionate, and combinations of any two or more thereof. Examples of suitable multivalent metallic compounds include, but are not limited to, sodium zirconium lactate, potassium zirconium lactate, ammonium zirconium lactate, ammonium zirconium carbonate, sodium zirconium carbonate, potassium zirconium carbonate, ammonium zirconium fluoride, ammonium zirconium chloride, zirconium ammonium citrate, zirconium chloride, tetrakis(triethanolamine)zirconate, zirconium carbonate, zirconyl ammonium carbonate, ammonium titanium carbonate, titanium chloride, titanium carbonate, ammonium titanium chloride, and combinations thereof. These compounds are commercially available. The presently most preferred cross-linking agents are Fe(III) chloride, Fe (III) sulfate, Al(III) chloride or Al(III) sulfate, zirconium chloride, chromium (III) chloride, and the like. Even more preferably are zirconium lactate and chromium (III) chloride.

The concentration of crosslinking agent used in the present invention depends largely on the concentrations of polymers in the composition and the desired gelation delay. Lower concentrations of polymer, e.g., require lower concentrations of the crosslinking agent. Further, it has been found that for a given concentration of polymer, increasing the concentration of crosslinking agent generally substantially decreases the time of gelation (increases the gelation rate).

The concentration of crosslinking agent in the injected slug varies generally over the broad range of about 1 mg/(ppm) to about 1,000 ppm, preferably over the range of about 5 ppm to about 500 ppm, and most preferably 5 ppm to 200 ppm based on Cr(I).

In addition to the crosslinkers, gel-delaying polymers, polymers and injection fluids described herein, the injection fluid may also contain other conventional additives including chelating agents to remove polymerization inhibitors, pH adjusters, initiators and other conventional additives, accelerators, retardants, corrosion inhibitors, scale inhibitors, biocides, fluid loss additives, and the like, as appropriate for the particular application. In addition, chemicals can be added that will reduce the adsorption of gelation chemicals to the oil reservoir.

An improved method of sweeping a reservoir is also provided herein, wherein an injection fluid is injected into a reservoir to mobilize and produce oil, the improvement comprising injecting, in order, a carboxylate-containing polymer, at least one gel-delaying polymer and a crosslinker plus a fluid into a reservoir, aging said carboxylate polymer, at least one gel-delaying polymer, crosslinker and fluid to increase its viscosity, injecting additional injection fluid into said reservoir to mobilize oil, and producing said oil. The aging time can be varied, as described herein, to allow compete penetration of the reservoir.

Typically, a solution of the carboxylate-containing polymer, the gel-delaying polymer and metal ionic crosslinker are mixed in-line before being pumped into the subterranean formation, followed by water to displace the solution from the well bore to prevent gelling at the wellbore. Alternatively, the carboxylate-containing polymer and the gel-delaying polymer can be injected and displaced by water before the metal ionic crosslinker is injected.

The nature of the subterranean formation is not critical to the practice of the processes described herein. The delayed gel-forming composition can be injected into said subterranean formation having a temperature range of from about 10° C. to about 180° C. Any means known to one skilled in the art such as, for example, pumps, can be used for injecting said gel-forming composition.

Another embodiment is a method of improving sweep efficiency of a fluid flood of a reservoir, said method comprising sequentially injecting the compositions herein described (plus polymer and fluid as needed) into a reservoir; aging the composition, e.g., 30-40 days or as needed, to increase its viscosity; injecting an injection fluid into said reservoir to mobilize the oil; and producing said mobilized oil.

Any suitable procedure for preparing the aqueous admixtures of the gellable polymers, dicarboxylate polymers, and liquid can be used. Some of the polymers can require particular mixing conditions, such as slow addition of finely powdered polymer into a vortex of stirred brine, alcohol pre-wetting, and protection from air (oxygen), preparation of stock solutions from fresh rather than salt water, as is known for such polymers.

As used herein, ppm refers to weight ratio in parts per million, based on total weight.

The term "polymer" refers to a molecule built up by repetitive bonding together of smaller units called monomers. The polymer can be linear, branched network, star, comb, or ladder types of polymer. The polymer can be a homopolymer in which a single monomer is used or can be copolymer in which two or more monomers are used. Types of copolymers include alternating, random, block, and graft.

The term "carboxylate-containing polymer" used herein refers to, unless otherwise indicated, a polymer that contains a plurality of free carboxylic acid groups or carboxylate groups in which the proton of the carboxylic acid is substituted with an ammonium ion, an alkali metal ion, an alkaline earth metal ion, or combinations of any two or more thereof, such that the pendant carboxylate groups can be crosslinked with a multivalent metal ion, thus forming a gel.

The term "gelation time" is defined as the time when the viscosity of the gel solution increases abruptly to a value greater than 1000 cP (100% scales) at a shear rate of 2.25 $s^{-1}$.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| Abbreviation | Meaning |
| --- | --- |
| PAsp | Polyaspartate |
| PEI | Polyethylenimine |
| PVA | polyvinyl alcohol |
| PVAS | polyvinyl alcohol succinate |
| MW | Average molecuar weight |
| HPAM | Hydrolyzed Poly-Acrylamide, partially hydrolyzed polyacrylamide |
| DS | Dextran sulfate |
| RO | Reverse osmosis |
| AC24 | Alcomer ® 24 |
| B29 | Microparticle of 5 mole % sodium acrylate and 95 mole % acrylamide |

BRIEF DESCRIPTION OF THE DRAWINGS

FIG. 1A-B. Water flooding wherein water bypasses oil, travelling the thief zones (FIG. 1A). However, the thief zones can be blocked by polymeric gels, foam gels, and the like, thus forcing water to sweep the reservoir and producing more of the original oil in place. (FIG. 1B).

DETAILED DESCRIPTION

The disclosure provides a novel method that delays gelling under the conditions typical of water flooding in situ and have particular utility in blocking thief zones of reservoirs, but other uses are possible, especially in the agriculture, remediation and drug delivery arts.

In one embodiment, the method involves sequentially injecting a carboxylate-containing polymer, a gel-delaying polymer, and a crosslinker in the reservoir. This injection sequence negates the need to form a separate nanogel comprising the gel-delaying polymer and a crosslinker, as seen in similar art. By adding the gel-delaying polymer before the crosslinker, delays the gelation from days to weeks, allowing for deeper reservoir penetration.

The sequential injection can be followed by injection of fluids to displace the gelling composition or recover hydrocarbons. Alternatively, the carboxylate-containing polymer and gel-delaying polymer can be injected, followed by a fluid injection, before the crosslinker is injected.

Figure 2:
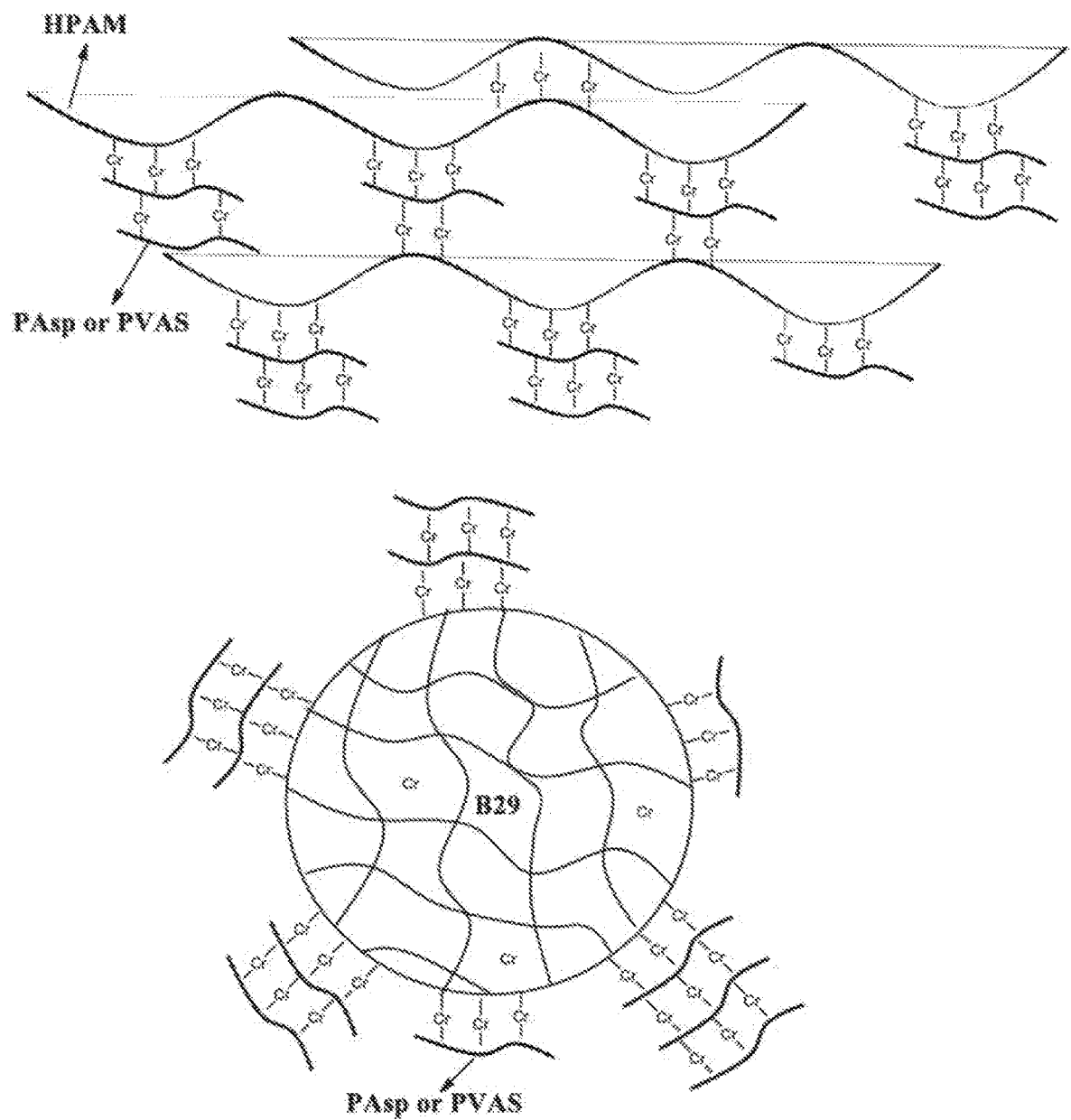
FIG. 2. Complex formation of HPAM/B29 with PAsp/PVAS and Cr(I).

In another embodiment, the gelant is injected as a single package complex of e.g. HPAM (AC24), temporarily carboxylated polymer such as poly(sodium aspartate)(PAsp) and/or polyvinyl alcohol succinate (PVAS), and metal ions (such as Cr(III)), as shown in FIG. 2. When the metal ion, e.g. Cr(III) is added into the mixture of HPAM and PAsp or PVAS, it will form complexes with the carboxyl groups of both HPAM and PAsp or PVAS, which leads to a single package of HPAM, PAsp and/or PVAS, Cr(III) complexes that can be injected. When settled into the reservoir, removal of carboxyl groups of PAsp or PVAS, triggered by hydrolysis or heat, will release the Cr(III), resulting in the HPAM forming a gel with Cr(III).

Molar ratios of COO from PVAS or PAsp to metal ion range from 2:1, 4:1, 6:1, 10:1, 12:1; 16:1 and 20:1. Molar ratios of 6:1 to 12:1 are most preferred.

This composition of HPAM, PAsp/PVAS, Cr(III) complex (gelant fluid) can move forward as a single package in underground reservoir, thus minimizing or avoiding separation occurrence during delivery in underground reservoir. Experiments are still being conducted to determine if the package can chromatically separate downhole.

The polymer used to delay the gelation can be made from monomers selected from the group of vinyl, allyl, styrene, and acrylamide monomers and their derivatives, or any polysaccharide, conjugated with a di-carboxylate or having naturally appended carboxylate groups. Any di-carboxylate (or tricarboxylate) can be used, including citrate, succinate, aspartate, glutamate, malate, oxalate, malonate, glutarate, adipate, pimelate, and the like, or a derivative thereof.

In some embodiments, the gel-delaying polymer is a polymer or copolymer of citrate, succinate, aspartate, glutamate, malate, oxalate, malonate, glutarate, adipate, pimelate, carbonate, and the like, or derivatives thereof.

In some preferred embodiments, the gel-delaying polymer comprises polyvinyl alcohol (PVA) succinate, N-hydroxylmethyl acrylamide (NHMA) succinate, allyl alcohol succinate and allylamine succinate, PVA malate, NHMA malate, allyl alcohol malate or allylamine malate. In other embodiments, the polymer is polyaspartate or polyglutamate, or the like.

The crosslinker is any multivalent metal ion whose presentation needs be delayed, and for reservoir use and tertiary crosslinking, these include chromium, zirconium, iron, aluminum, and titanium ions. In some preferred embodiments, the multivalent metal ion is Cr(III).

Any carboxylate-containing polymer can be used in the injection, provided such polymer can be crosslinked with the metal ion. Such polymers include, e.g., partially hydrolyzed polyacrylamide, copolymers of N-vinyl-2-pyrrolidone and sodium acrylate, tetrapolymers of sodium-2-acrylamido-2-methylpropanesulfonate, acrylamide and N-vinyl-2-pyrrolidone and sodium acrylate; and copolymers of sodium-2-acrylamido-2-methylpropanesulfonate and sodium acrylate; and combinations thereof.

In some embodiments, the carboxylate-containing polymer is HPAM or B29.

An improved method of sweeping a reservoir is also provided herein, wherein an injection fluid is injected into a reservoir to mobilize and produce oil, the improvement comprising injecting, in order, a carboxylate-containing polymer, at least one gel-delaying polymer and a crosslinker plus a fluid into a reservoir, aging said carboxylate polymer, at least one gel-delaying polymer, crosslinker and fluid to increase its viscosity, injecting additional injection fluid into said reservoir to mobilize oil, and producing said oil. The aging time can be varied, as described herein, to allow compete penetration of the reservoir.

Another improved method of sweeping a reservoir is also provided herein, wherein an injection fluid is injected into a reservoir to mobilize and produce oil, the improvement comprising injecting, in order, a carboxylate-containing polymer, at least one gel-delaying polymer and a crosslinker plus a fluid into an in-line mixer, mixing to form a complex, injecting said complex into the reservoir followed by an optional fluid injection to displace the complex, aging said complex and fluid to increase its viscosity, injecting additional injection fluid into said reservoir to mobilize oil, and producing said oil.

Another embodiment is a method of improving sweep efficiency of a fluid flood of a reservoir, said method comprising sequentially injecting the compositions herein described (plus polymer and fluid as needed) into a reservoir; aging the composition, e.g., 30-40 days or as needed (depending on reservoir temperature), to increase its viscosity; injecting an injection fluid into said reservoir to mobilize the oil; and producing said mobilized oil.

Another yet embodiment is a method of improving sweep efficiency of a fluid flood of a reservoir, said method comprising injecting a complex formed by a carboxylate-containing polymer, a gel-delaying polymer, and a cross-linker herein described (plus polymer and fluid as needed) into a reservoir; aging the composition, e.g., 30-40 days or as needed (depending on reservoir temperature), to increase its viscosity; injecting an injection fluid into said reservoir to mobilize the oil; and producing said mobilized oil.

The following experiments were performed to monitor gelling times for different compositions for use in deep oil-bearing formations. The gels described below utilized either Synthetic Brine A, listed in Table 1, or Synthetic Brine B, listed in Table 2.

TABLE 1

Composition of Synthetic Brine A

| Component | Concentration, g/kg |
|---|---|
| NaCl | 22.982 |
| KCl | 0.151 |
| $CaCl_2 \cdot 2H_2O$ | 0.253 |
| $MgCl_2 \cdot 6H_2O$ | 1.071 |
| $NaHCO_3$ | 2.706 |
| $Na_2SO_4$ | 0.145 |
| Water | To 1000 g |

TABLE 2

Composition of Synthetic Brine B

| Component | Concentration, g/kg |
|---|---|
| NaCl | 18.420 |
| KCl | 0.424 |
| $CaCl_2 \cdot 2H_2O$ | 0.550 |
| $MgCl_2 \cdot 6H_2O$ | 0.586 |
| $SrCl_2 \cdot 6H_2O$ | 0.061 |
| $NaHCO_3$ | 3.167 |
| $Na_2SO_4$ | 0.163 |
| Water | To 1000 g |

Several gelation tests were performed on the various gel made herein to demonstrate the suitability of the injection order with delayed gelation times. Brookfield Digital Viscometer Model LVDV-II+PCP was used to monitor the viscosity changes of gelant and control solutions and determine the gel time of the gelant solutions. The gelation process was monitored as a function of time starting from the point of visual homogeneous dispersion. The gelation time was defined as the time when the viscosity of the gel solution increases abruptly to a value greater than 1000 cP (100% scales) at a shear rate of $2.25 \text{ s}^{-1}$. The temperature of the viscometer was controlled at the stated temperatures during the measurements.

Gelation of AC24, PAsp and $CrCl_3$

A solution of Alcomer® 24 (AC24), the HPAM source, containing PAsp was prepared through mixing AC24 and PAsp, followed by addition of $CrCl_3$, in Synthetic Brine A while stirring.

In an oxygen-free glove box, 75.00 g of 1% of AC24 in Synthetic Brine A was mixed with 7.73 g of a PAsp solution ([PAsp]=25.75 mg/g, pH=7.88 adjusted by NaOH and HCl) in 65.30 g of deoxygenated Synthetic Brine A with stirring. 1.97 g of a $CrCl_3$ solution ([Cr(III)]=7627 ppm) was added into the mixture of AC24 and PAsp while stirring to obtain a final AC24 concentration of 0.5%; final Cr(III) concentration of 100 ppm; and final molar ratio of COO— of PAsp to Cr(III) of 6:1.

The initial viscosity was recorded before the solution was divided into 6 ml vials and incubated at 120, 100 and 85° C. The viscosities of the samples were monitored as a function of time.

Figure 3:
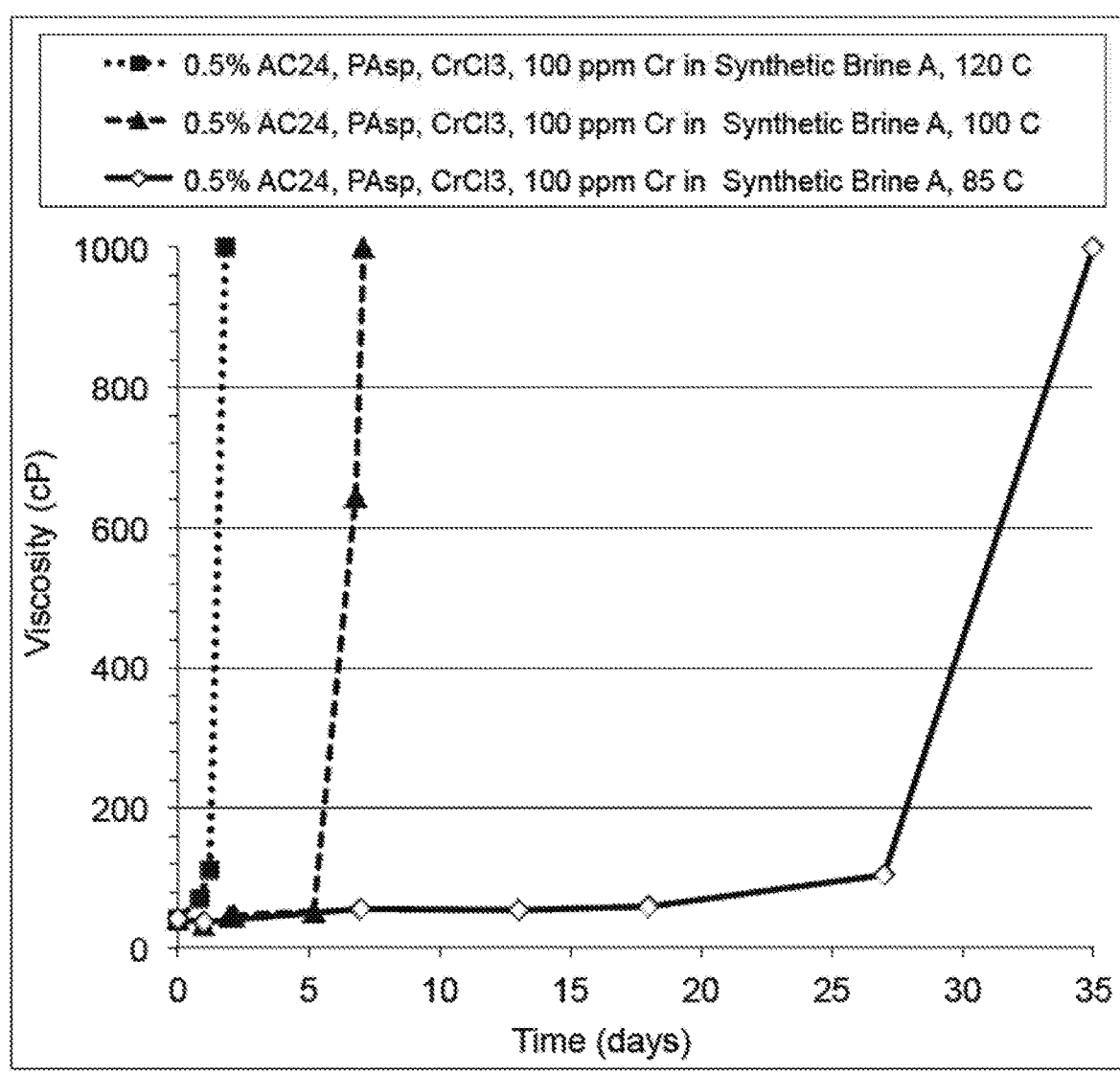
FIG. 3. Gelation of AC24, PAsp, and $CrCl_3$ in Synthetic Brine A at 120, 100, and 85° C.

The gelation results are shown in FIG. 3. As this figure shows, the mixture of AC24, PAsp, and $CrCl_3$ gelled within 2, and 5 days at 120 and 100, respectively. However, at 85° C., the gelation was delayed by 35 days. While 85° C. is the target temperature for the analysis, this increasing delay in time of gelation is expected for temperatures lower than 85° C. because the amide bond hydrolysis of PAsp is very slow at low temperature, such as 65° C.

Gelation of B29, PAsp and $CrCl_3$

In addition to HPAM, the delay gelation was expected to occur in a similar polymer B29.

A sample of B29 (an expandable microparticle containing 95 mole percent acrylamide and 5 mole percent sodium acrylate, see e.g., US20140196894) in Synthetic Brine B was first prepared followed with addition of PAsp. $CrCl_3$ in Synthetic Brine B was then added to this mixture. The details of this gelation experiment are described below:

In an oxygen-free glove box, 2.50 g of 30% B29 was added into 137.09 g deoxygenated Synthetic Brine B with 1.25 g of 30% of an inverting surfactant while stirring. 7.01 g of PAsp solution ([PAsp]=28.03 mg/g) was added to the stirring mixture. Finally, 2.06 g $CrCl_3$ solution ([Cr(III)]=7284 ppm) was added into the above mixture of B29 and PAsp while stirring. Final B29 concentration was 0.5%; final Cr(III) concentration was 100 ppm; and final molar ratio of COO— of PAsp to Cr(III) was 6:1.

As with the HPAM example above, the initial viscosity was recorded before the solution was divided into 6 ml vials and incubated at 120, 100 and 85° C. The viscosities of the samples were monitored as a function of time.

Figure 4:
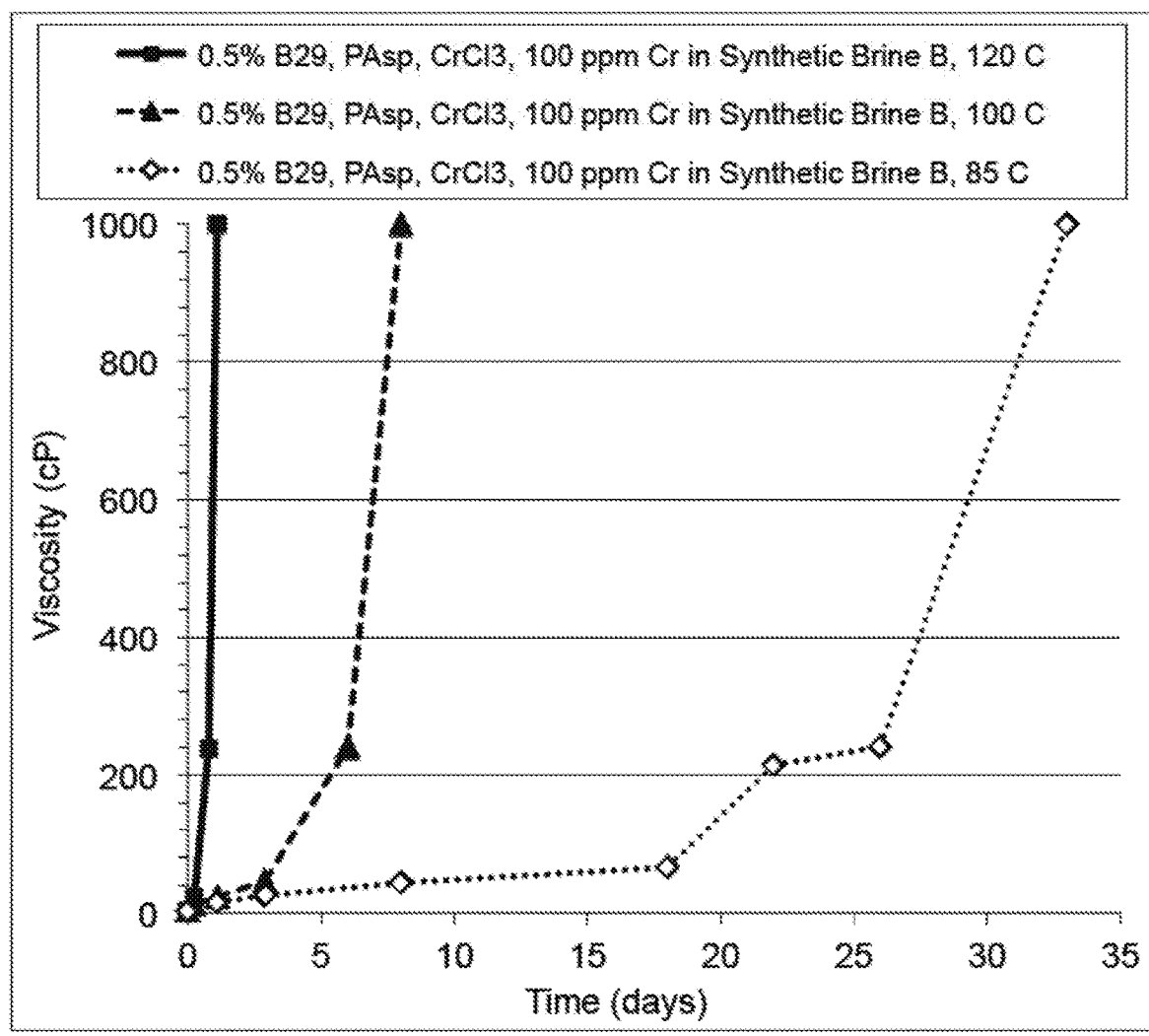
FIG. 4. Gelation of B29, PAsp, and $CrCl_3$ in Synthetic Brine B at 120, 100, and 85° C.

The results are shown in FIG. 4. As this figure shows, the mixture of B29, PAsp, and $CrCl_3$ complex gelled within 1, 8 and 33 days at 120, 100 and 85° C., respectively. Again, much longer delay in gelation was observed at 85° C.

B29 is largely the same as HPAM once it is popped, but its degree of hydrolysis is a bit lower (5%), thus it gels a little slower. However, both HPAM and B29 gelled in about the same time at identical temperatures.

Gelation of AC24, PVAS and $CrCl_3$

Gels using PVAS in place of PAsp were also prepared to observe the differences in delay gelling.

A representative single package complex, herein referred to as AC24, PVAS, Cr(III), was prepared through mixing AC24 and PVAS with Cr(III) as CrCl₃ in Synthetic Brine A while stirring. In more detail:

A stock PVAS solution was prepared through the reaction of poly(vinyl alcohol), Mw 25 k, 88 mol % degree of hydrolysis) with succinic anhydride using triethylamine as catalyst in N-methyl-2-pyrrolidone as solvent according to the procedure reported in the literature.[20]

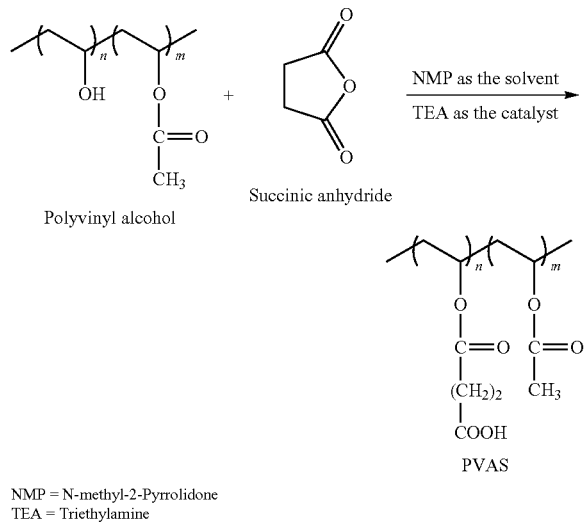

NMP = N-methyl-2-Pyrrolidone
TEA = Triethylamine

Stock solutions of PVAS and CrCl₃ were prepared in RO water. The concentration of the PVAS stock solution was 66.17 mg/g and the concentration of the Cr(III) was 7841 ppm.

In an oxygen-free glove box, 25.00 g of 1% of AC24 was stirred into Synthetic Brine A. 2.73 g of the PVAS stock solution in 21.64 g deoxygenated Synthetic Brine A was added to the AC24 and stirred. 0.64 g of the CrCl₃ stock solution was added to the above mixture of AC24 and PVAS while stirring. Final AC24 concentration was 0.5%; final Cr(III) was 100 ppm; final molar ratio of COOH of PVAS to Cr(III) was 12:1.

The initial viscosity was recorded before the solution was divided into 6 ml vials and incubated at 85 and 65° C. The viscosities of the samples were monitored as a function of time.

Figure 5:
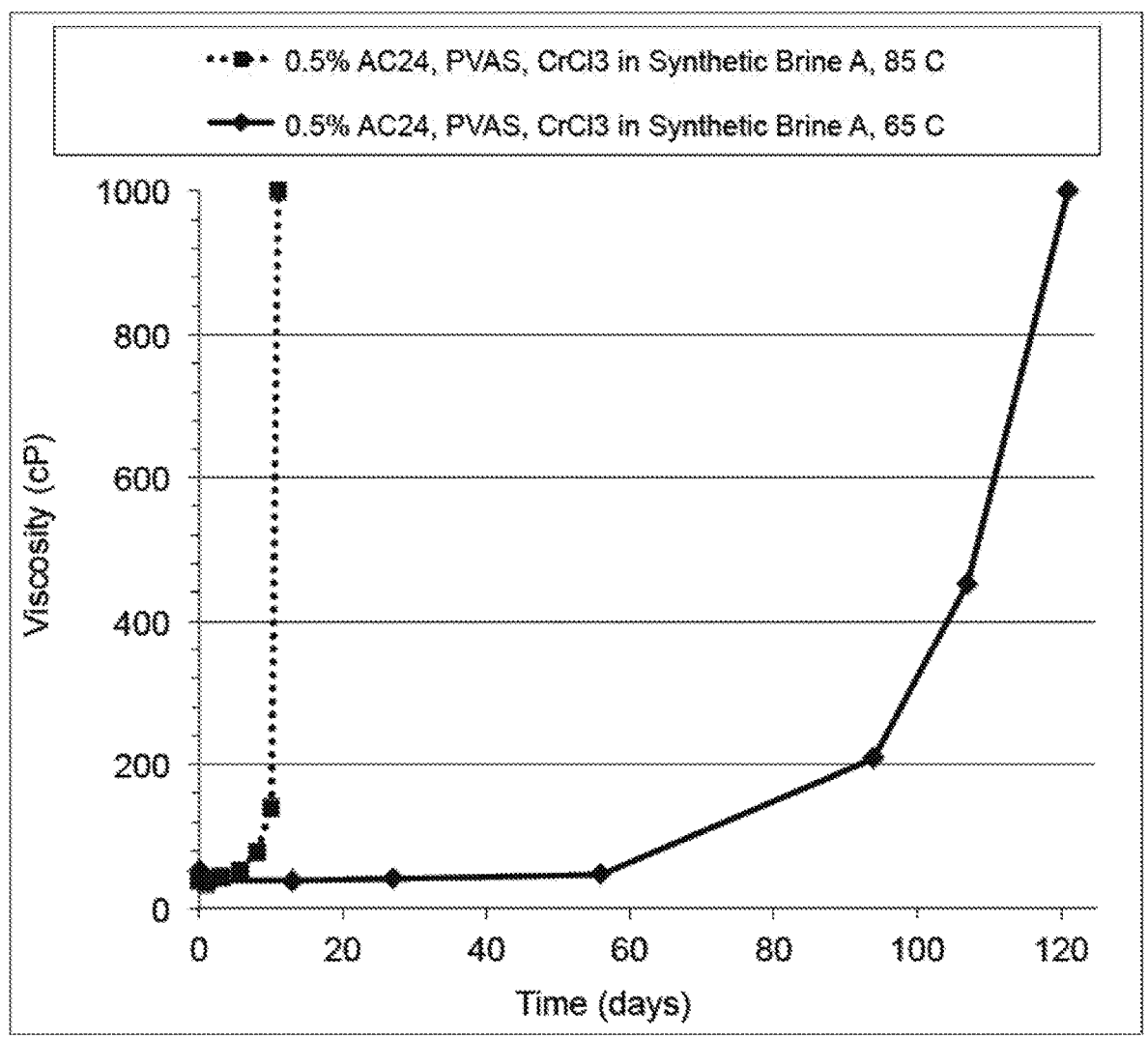
FIG. 5. Gelation of AC24, PVAS, and $CrCl_3$ in Synthetic Brine A at 85 and 65° C.

The results are shown in FIG. 5. As this figure shows, the single package of AC24, PVAS, CrCl₃ complex gelled within 10 and 121 days at 85 and 65° C., respectively.

The difference in the experimental target values of the PVAS and PAsp system is due to the bonds being hydrolyzed. The PVAS system controls the release of metal ion crosslinkers by ester bond hydrolysis, which is faster than the amide bond hydrolysis of PAsp at the same temperature, e.g. 85° C. Thus, it is necessary to study the PVAS system at lower temperatures to slow the hydrolysis steps. As such, cooler temperatures are necessary to achieve larger delay times for the PVAS system.

Gelation of B29, PVAS and CrCl₃

Gels using PVAS in place of PAsp with B29 were also prepared to observe the differences in delay gelation time.

In an oxygen-free glove box, 1.67 g of 30% B29 was inverted into 90.76 g of deoxygenated Synthetic Brine A with 0.83 g of an inverting surfactant while being stirred. Then, 5.46 g of the PVAS solution (66.17 mg/g) was stirred into the B29 solution. Finally, 1.28 g of the CrCl₃ stock solution (7841 ppm) was added the above mixture of B29 and PVAS while stirring. Final B29 concentration was 0.5%; final Cr(III) was 100 ppm; final molar ratio of COO— of PVAS to Cr(III) is 12:1.

The initial viscosity was recorded before the solution was divided into 6 ml vials and incubated at 85 and 65° C. The viscosities of the samples were monitored as a function of time.

Figure 6:
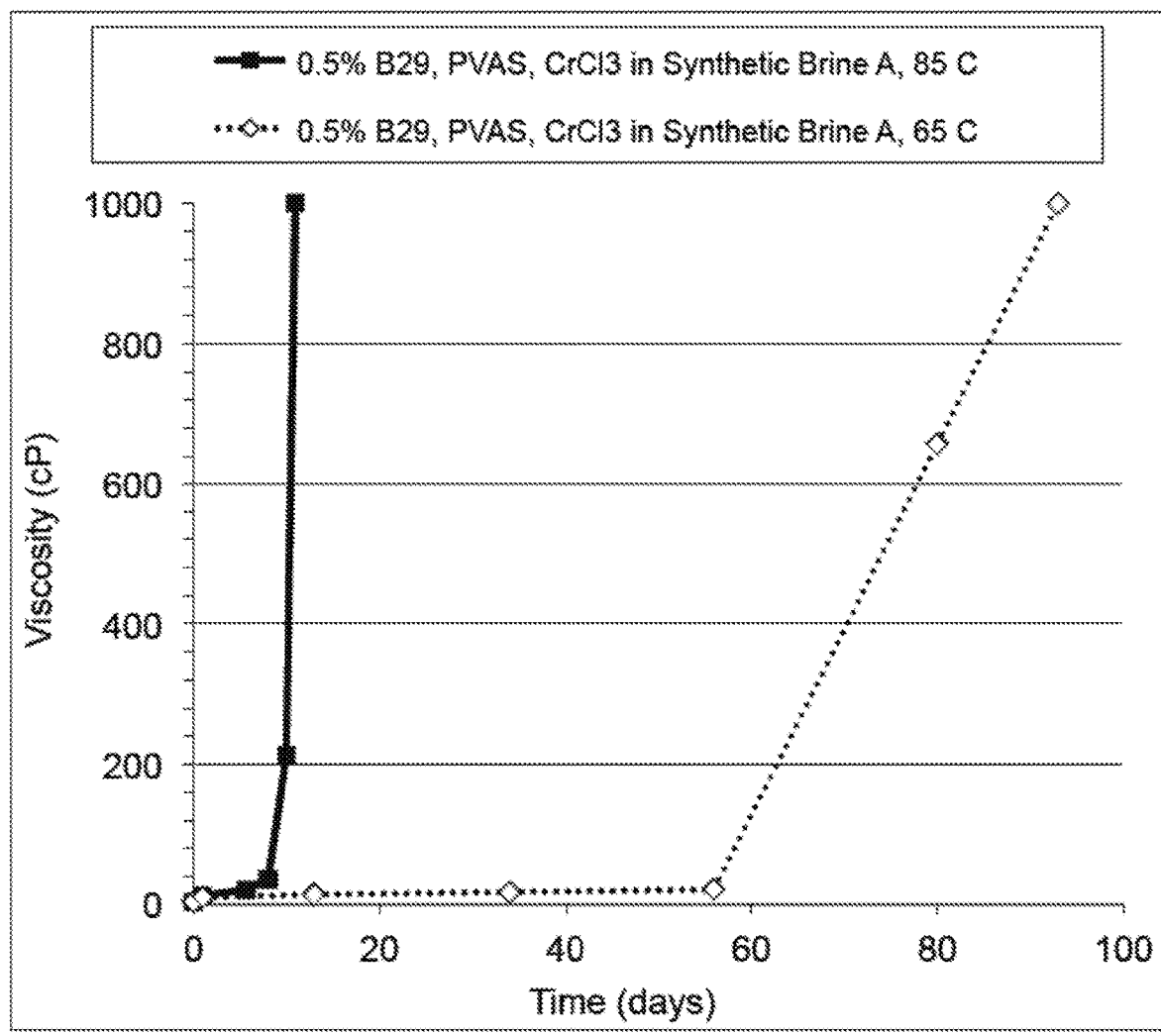
FIG. 6. Gelation of B29, PVAS, and $CrCl_3$ in Synthetic Brine B at 85 and 65° C.

The results are shown in FIG. 6. As this figure shows, single package of B29, PVAS, CrCl₃ complex gelled within 10 and 93 days at 85 and 65° C., respectively.

The present invention is exemplified with respect to the above examples and figures, however, this is exemplary only, and the invention can be broadly applied to many polymers systems used to block thief zones in hydrocarbon recovery techniques. The above examples are intended to be illustrative only, and not unduly limit the scope of the appended claims.

The following references are incorporated by reference in their entirety for all purposes.

Needham, R. B., et al., "Control of Water Mobility Using Polymers and Multivalent Cations," Paper SPE 4747 Presented at Improved Oil Recovery of SPE, Tulsa, Okla., Apr. 22-24, 1974.

Threlkeld, C. B., et al., "Method for Reducing the Permeability of Subterranean Formations to Brines," U.S. Pat. No. 3,949,811, Apr. 13, 1976.

Mumallah, N., "Chromium (III) Propionate: A Crosslinking Agent for Water-Soluble Polymers in Hard Oilfield brines," SPE reservoir Engineering, February 1988, PP 243-250.

Sydansk, R. D., "A New Conformance-Improvement-Treatment Chromium (III) Gel Technology," Paper SPE/DOE 17329, Presented at the SPE/DOE Enhanced Oil Recovery Symposium, Tulsa, Okla. Apr. 17-20, 1988.

Sydansk, R. D., "Field Testing of a New Conformance-Improvement-Treatment Chromium (III) Gel Technology," Paper SPE/DOE 17383, Presented at the SPE/DOE Enhanced Oil Recovery Symposium, Tulsa, Okla. Apr. 17-20, 1988.

Sydansk, R. D., "A Newly Developed Chromium (111) Gel Technology," SPE Reservoir Engineering, August 1990, pp 346-352.

Sydansk, R. D., "More Than 12 Years' Experience With a Successful Conformance-Control Polymer-Gel Technology," Paper SPE 49315, Presented at 1998 SPE Annual Technical. Conference & Exhibition, New Orleans, La., Sep. 27-30, 1998.

Sydansk, R. D., "More Than 12 Years' Experience With a Successful Conformance-Control Polymer-Gel Technology," Paper SPE 62561, Presented at 2000 SPE/AAPG Western Regional Meeting, Long Beach, Calif. Jun. 19-23, 2000.

Sydansk, R. D., "Acrylamide-Polymer/Chromium (III)-Carboxylate Gels for Near Wellbore Matrix Treatments," SPE Advanced Technology Series, Vol 1. No 1, pp 146-152.

Sydansk, R. D. & Argabright, P. A., "Conformance Improvement in a Subterranean Hydrocarbon-Bearing Formation Using a Polymer Gel," U.S. Pat. No. 4,683,949, Aug. 4, 1987.

Sydansk, R. D., "Hydrocarbon Recovery Process Utilizing a gel Prepared From a Polymer and a Preferred Crosslinking Agent," U.S. Pat. No. 5,415,229, May 16, 1995.

Sydansk, R. D., "Process for Reducing Permeability in a Subterranean Hydrocarbon-Bearing Formation," U.S. Pat. No. 5,421,411, Jun. 6, 1995.

Moffitt, P., et al., "Development and Field Testing of a New Low Toxicity Polymer Crosslinking System," Paper, SPE 35173, Presented at the Permian Basin Oil and Gas Recovery Conference, Midland, Tex., Mar. 27-29, 1998.

Albonico, P., et al., "Effective Gelation-Delaying Additives for Cr+3/Polymer Gels," Paper SPE 25221, Presented at the SPE International Symposium on Oilfield Chemistry, New Orleans, La., Mar. 2-5, 1993.

Albonico, P., et al., "New Polymer Gels for Reducing water Production in High-Temperature Reservoirs," Paper SPE 27609, Presented at European Production Operations Conference and Exhibition, Aberdeen, U.K. Mar. 15-17, 1994.

Bartosek, M., et al., "Polymer Gels for Conformance Treatments: Propagation of Cr(III) Crosslinking Complexes in Porous Media," Paper SPE/DOE 27828, Presented at the SPE/DOE Ninth Symposium on Improved Oil Recovery, Tulsa, Okla. Apr. 17-20, 1994.

Broseta, D., et al., "Rheological Screening of Low Molecular Weight Polyacrylamide/Chromium(III) Acetate Water Shutoff Gels, Paper SPE 59319, Presented at the 2000 SPE/DOE Improved Oil Recovery Symposium, Tulsa, Okla. Apr. 3-5, 2000.

Albonico, P. & Lockhart, T. P., "Divalent Ion-Resistant Polymer gels for High-Temperature Applications: Syneresis Inhibiting additives," Paper SPE 25220, Presented at SPE International Symposium on Oilfield Chemistry, New Orleans, La., Mar. 2-5, 1993.

Lockhart, T. P., "Chemical properties of Chromium/Polyacrylamide gels," SPE Advanced Technology Series, Vol2, No 2. pp. 199-205.

Sanchez-Chaves, M., et al., "Poly (vinyl alcohol) functionalized by monosuccinate groups. Coupling of bioactive amino compounds" Polymer, Vol. 39, No. 13, 2751-2757, 1998.

U.S. Pat. No. 3,749,172 Methods of using gelled polymers in the treatment of wells US20140202693 Nanogels for delayed gelation US20120037364 Delayed gelling agents US20140196894 Fluorescent tags for detection of swellable polymers

The invention claimed is:

1. A delayed gelling composition comprising a gelling solution made by sequentially combining i) a carboxylate-containing polymer in an injection fluid with at least one gel-delaying polymer and mixing to form an intermediate solution, and ii) combining said intermediate solution with a crosslinker and admixed to form said gelling solution without forming a separate nanogel.

2. The delayed gelling composition of claim 1), wherein said crosslinker is a multivalent metal ion selected from chromium, zirconium, iron, aluminum, and titanium.

3. The delayed gelling composition of claim 1), wherein said crosslinker is polyethylenimine (PEI).

4. The delayed gelling composition of claim 1), wherein said carboxylate-containing polymer is partially hydrolyzed polyacrylamide (HPAM); copolymers of N-vinyl-2-pyrrolidone and sodium acrylate; tetrapolymers of sodium-2-acrylamido-2-methylpropanesulfonate, acrylamide, N-vinyl-2-pyrrolidone and sodium acrylate; copolymers of sodium-2-acrylamido-2-methylpropanesulfonate and sodium acrylate; carboxylated polysaccharide; carboxymethylcellulose; carboxylated guar; and combinations thereof.

5. The delayed gelling composition of claim 1), wherein said carboxylate-containing polymer is a microparticle containing partially hydrolyzed polyacrylamide (HPAM).

6. The delayed gelling composition of claim 1), wherein said gel-delaying polymer is made from monomers selected from the group of vinyl, allyl, styrene, and acrylamide monomers and their derivatives, conjugated with a dicarboxylate or tricarboxylate.

7. The delayed gelling composition of claim 1), wherein said gel-delaying polymer is polyvinyl alcohol succinate (PVAS), N-hydroxymethyl acrylamide (NHMA) succinate, allyl alcohol succinate and allylamine succinate, PVA malate, NHMA malate, allyl alcohol malate or allylamine malate.

8. The delayed gelling composition of claim 1), wherein said gel-delaying polymer is carboxylated polymer polyaspartate (PAsp), polymalate, polyoxalate, polymalonate, polyglutarate, polyadipate, or polypimelate.

9. The delayed gelling composition of claim 1), wherein said gel-delaying polymer is polyaspartate (PAsp), said crosslinker is Cr(III) and said carboxylate-containing polymer is partially hydrolyzed polyacrylamide (HPAM).

10. The delayed gelling composition of claim 1), wherein said gel-delaying polymer is polyvinyl alcohol succinate (PVAS), said crosslinker is Cr(III) and said carboxylate-containing polymer is partially hydrolyzed polyacrylamide (HPAM).

11. The delayed gelling composition of claim 1), wherein said gel-delaying polymer is polyaspartate (PAsp), said crosslinker is Cr(III) and said carboxylate-containing polymer is a microparticle containing partially hydrolyzed polyacrylamide (HPAM).

12. The delayed gelling composition of claim 1), wherein said gel-delaying polymer is polyvinyl alcohol succinate (PVAS), said crosslinker is Cr(III) and said carboxylate-containing polymer is a microparticle containing partially hydrolyzed polyacrylamide (HPAM).

13. The delayed gelling composition of claim 1), wherein said carboxylate-containing polymer, said at least one gel-delaying polymer, and said crosslinker form a complex.

14. The delayed gelling composition of claim 13), wherein said complex comprises polyvinyl alcohol succinate (PVAS) as the gel-delaying polymer, Cr(III) as the crosslinker, and partially hydrolyzed polyacrylamide (HPAM) as the carboxylate-containing polymer.

15. The delayed gelling composition of claim 14), wherein the molar ratio of the $COO^-$ groups from the PVAS to the Cr(III) is 12:1.

16. The delayed gelling composition of claim 13), wherein said complex comprises polyaspartate (PAsp) as the gel-delaying polymer, Cr(III) as the crosslinker, and partially hydrolyzed polyacrylamide (HPAM) as the carboxylate-containing polymer.

17. The delayed gelling composition of claim 16), wherein the molar ratio of $COO^-$ groups from the PAsp to the Cr(III) is 6:1.

18. The delayed gelling composition of claim 13), wherein said complex comprises polyvinyl alcohol succinate (PVAS) as the gel-delaying polymer, Cr(III) as the crosslinker, and a microparticle containing partially hydrolyzed polyacrylamide (HPAM) as the carboxylate-containing polymer.

19. The delayed gelling composition of claim 13), wherein said complex comprises polyaspartate (PAsp) as the gel-delaying polymer, Cr(III) as the crosslinker, and a microparticle containing partially hydrolyzed polyacrylamide (HPAM) as the carboxylate-containing polymer.

* * * * *